Figure 1:
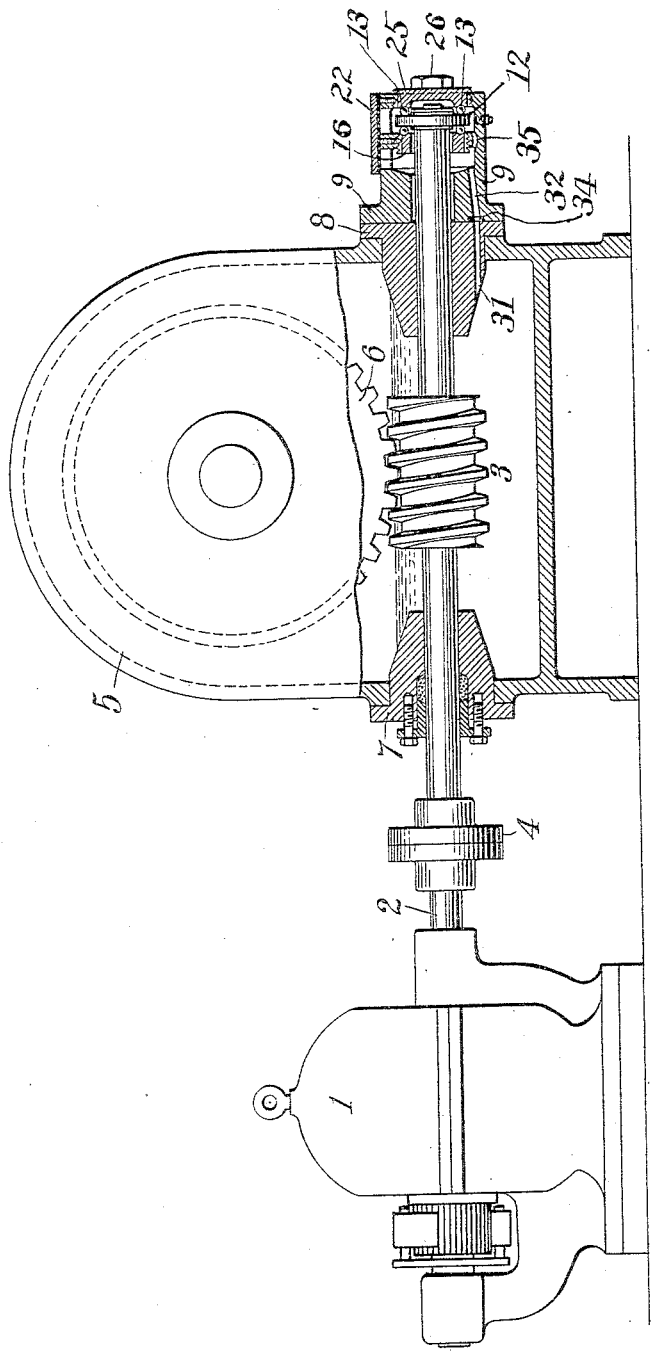

F. H. COURTNEY.
THRUST BEARING.
APPLICATION FILED DEC. 28, 1908.

933,627.

Patented Sept. 7, 1909.

3 SHEETS—SHEET 1.

Witnesses:
Edw. W. Vaill Jr.
James J. Cosgrove

Inventor
Frank H. Courtney
By his Attorneys
Betts Sheffield Betts

F. H. COURTNEY.
THRUST BEARING.
APPLICATION FILED DEC. 28, 1908.

933,627.

Patented Sept. 7, 1909.

3 SHEETS—SHEET 2.

Witnesses:
Edw. W. Vaill Jr.
James J. Cosgrove

Inventor
Frank H. Courtney
By his Attorneys
Betts Sheffield Bentley & ...

F. H. COURTNEY.
THRUST BEARING.
APPLICATION FILED DEC. 28, 1908.
933,627.
Patented Sept. 7, 1909.
3 SHEETS—SHEET 3.
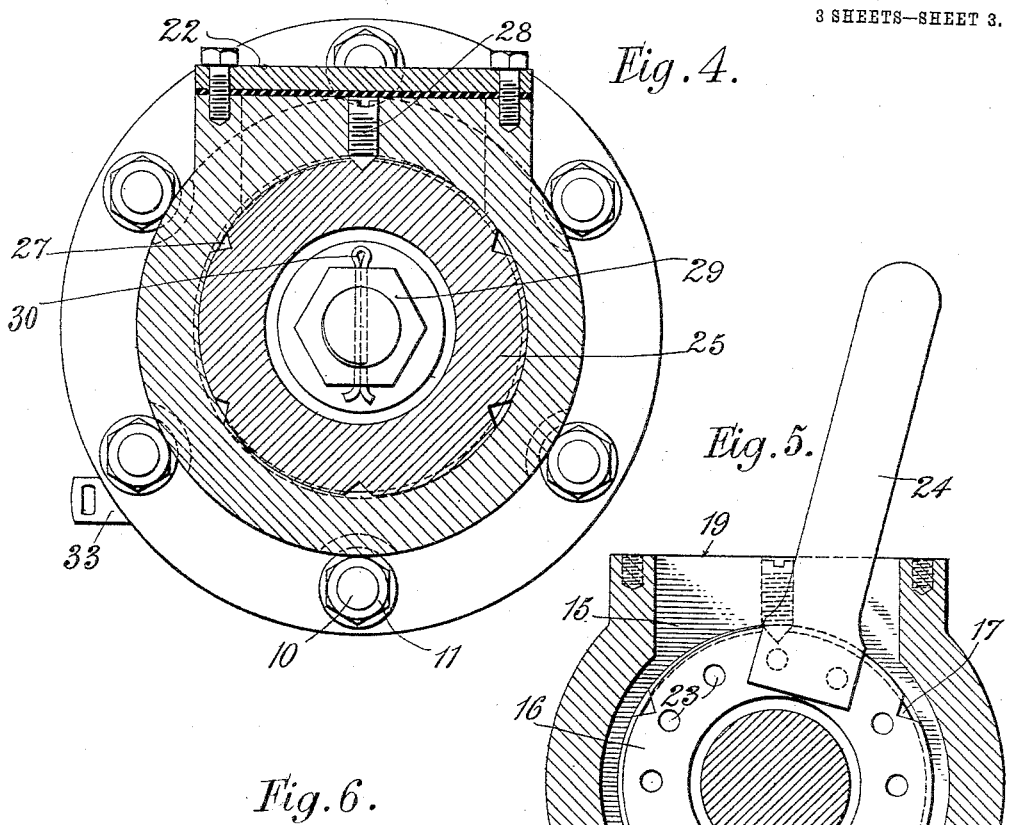
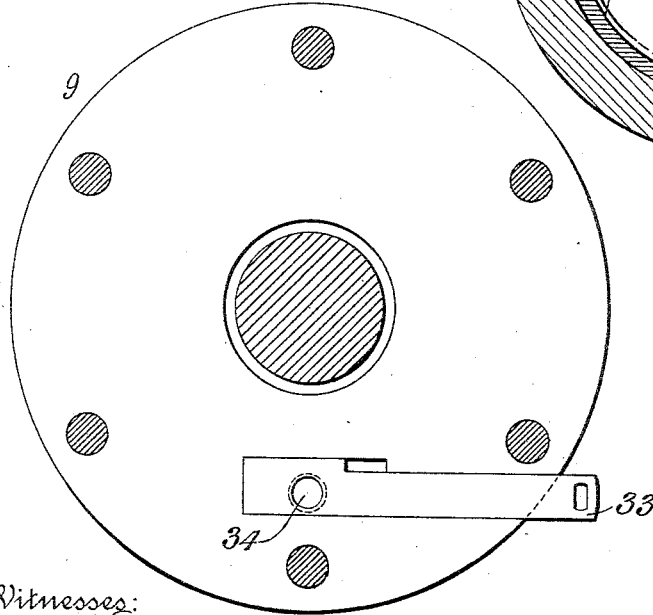
Witnesses:
Edw. W. Vaill Jr.
James Cosgrove
Inventor
Frank H. Courtney.
By his Attorneys

UNITED STATES PATENT OFFICE.

FRANK H. COURTNEY, OF NEW YORK, N. Y.

THRUST-BEARING.

933,627.    Specification of Letters Patent.    Patented Sept. 7, 1909.

Application filed December 28, 1908. Serial No. 469,525.

*To all whom it may concern:*

Be it known that I, FRANK H. COURTNEY, a citizen of the United States, residing in the borough of Bronx, city and State of New York, have invented certain new and useful Improvements in Thrust-Bearings, of which the following is a full, clear, and complete disclosure.

My invention relates to bearings for shafts on which there is an end thrust, as on those usually employed in connection with worm gearing, connected with winding drums for electric or other elevators.

Heretofore, the use of thrust bearings on the motor shaft of elevator equipments has been accompanied by much inconvenience and unsatisfactory results, owing to the fact that the means for adjusting the end-play and taking up the back lash have been so arranged as to necessitate a practical disassembling of the driving mechanism in order to allow access to the parts requiring adjustment. Furthermore, it has been possible to adjust the thrust bearing only in one direction, and after adjustment the back lash taken up has caused the motor shaft, and consequently the armature of the motor, to be displaced by an amount equal to the wear on the parts of the thrust bearing. This has affected the normal position of the brushes on the commutator of the motor as well as the normal position of the armature as regards the magnetic circuit.

The patent to W. H. Hultgren, No. 468,043, dated February 2, 1892, shows a thrust bearing of the type above referred to, and over which my invention is an improvement.

The object of my invention is to overcome these objections and to provide a thrust bearing, the parts of which may be easily adjusted without taking the driving mechanism apart; which allows the adjustments to be made without displacing the motor shaft from its normal position; and which will permit the removal and replacement of the thrust bearing without withdrawing the lubricating oil from the gear case.

A further object of my invention is to provide a thrust bearing which may be attached to or embodied in the existing forms of driving mechanisms for elevator motor shafts without altering their arrangements or designs.

My invention resides in providing the worm or motor shaft, at the outer end, with an improved thrust bearing, preferably a ball bearing, and in surrounding the bearing with a casing attached to the outer side of the worm gear casing.

My invention also comprises an arrangement of oil channels by which the oil in the gear casing is caused to circulate through the casing of the thrust bearing.

For a detailed description of one form of my invention which I at present deem preferable, reference may be had to the following specification and to the accompanying drawings forming a part thereof, in which—

Figure 2:
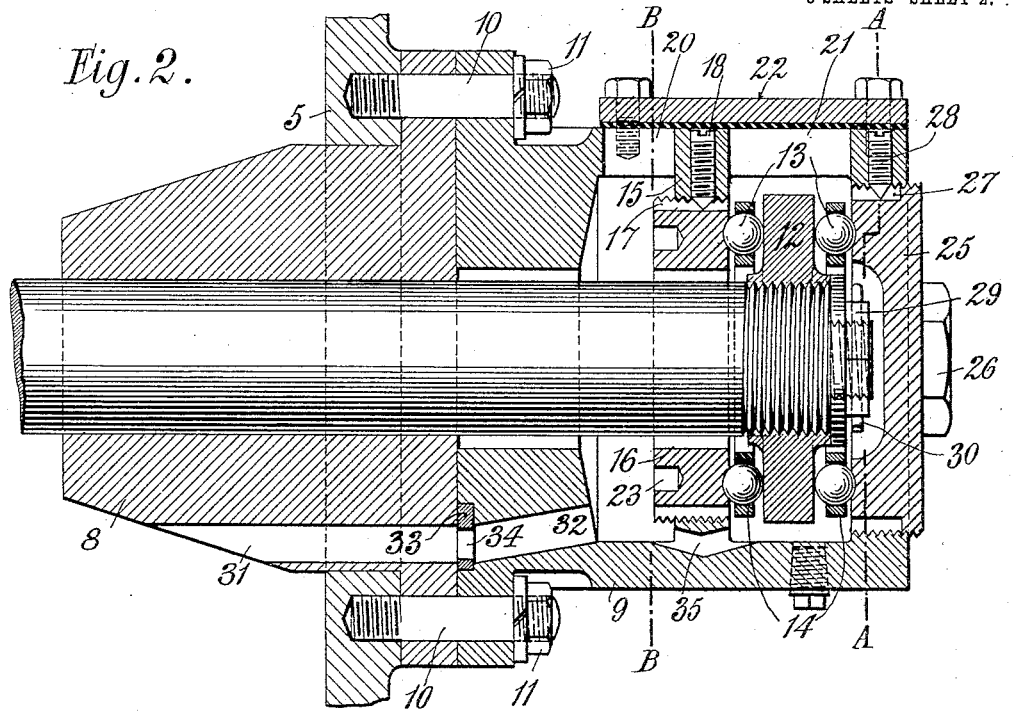
Figure 3:
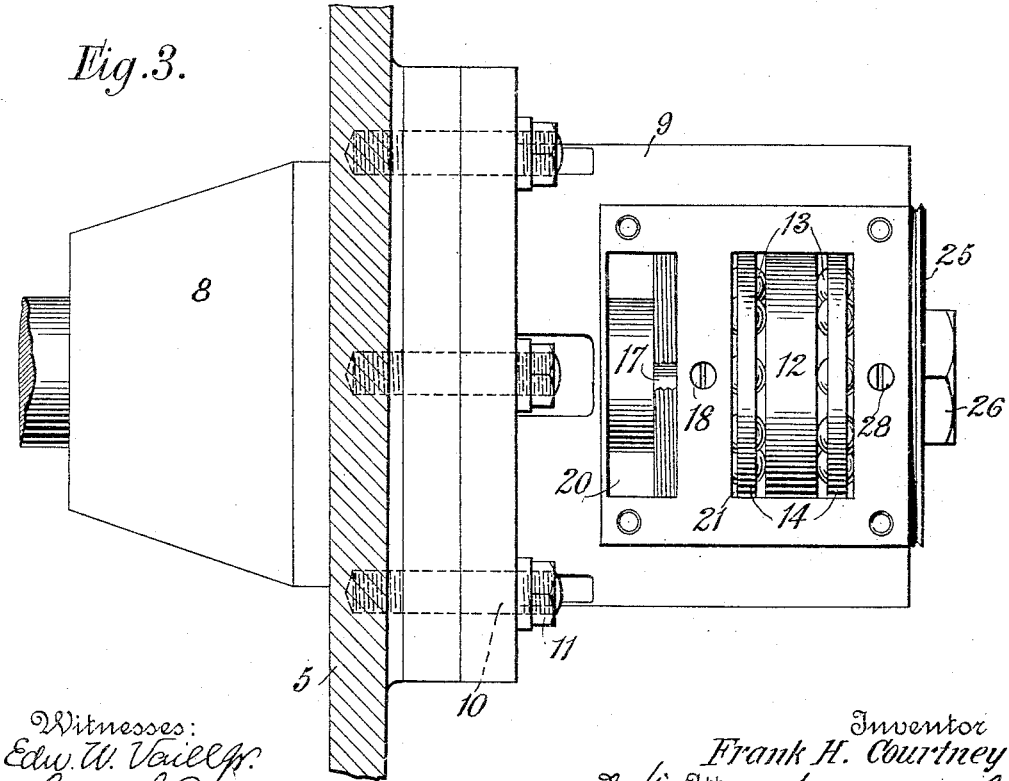

Figure 1 is a side elevation of the driving mechanism for an electric elevator drum, the gear casing and bearings being shown partly in section; Fig. 2 is an enlarged sectional view of the improved thrust bearing; Fig. 3 is a plan view thereof showing the cover of the casing removed; Fig. 4 is a transverse sectional view taken upon the line A—A of Fig. 2; Fig. 5 is a transverse sectional view taken upon the line B—B, Fig. 2, and showing the adjusting spanner or wrench in position; and Fig. 6 is an end view of a part of the casing of the bearing, showing the gate or valve for controlling the admission of oil from the gear casing.

Referring to Fig. 1 of the drawings, the numeral 1 indicates an electric motor for driving the shaft 2 which carries the worm or screw 3. The usual coupling 4 may be used between the motor 1 and the worm 3 to facilitate easy disconnection of the motor and the removal of its armature; 5 indicates a casing through which the shaft 2 passes and which contains the worm 3 and the worm gear 6. The bearings for the shaft 2 comprise two bearing bonnets 7 and 8 which are retained in openings in the casing 5 and form a part thereof in the usual manner. The outer bearing bonnet 8 carries an auxiliary casing 9 and both are preferably attached to the casing 5 by means of studs 10 passing through the flange of the bonnet 8 and upon which are nuts 11. The casing 9 is substantially cylindrical in shape and its interior is sufficiently large to receive the bearing disk 12 of the thrust bearing, which is attached to the outer end of the shaft 2. Anti-friction devices, such as balls 13, contact with the opposite side of the bearing disk 12. The balls 13 or similar anti-friction devices are preferably carried in retainers 14 of any suitable form. The balls 13 are held in position in relation to the disk 12 by two adjustable parts, arranged as follows: The interior of the casing is provided with an interiorly screw-threaded flange 15 which carries an exteriorly screw-threaded ring 16, which preferably has a ball-race on its side toward the disk 12. The ring 16 is also provided with a series of transverse notches or V-shaped grooves 17 adapted to receive the inner end of a set-screw 18 carried by the casing 9. These grooves are preferably equally spaced apart so as to give a definite axial movement of the ring for a fractional turn thereof. The top of the casing 9 is preferably made flat, as indicated at 19, and is provided with openings 20 and 21 to permit of access to the bearing. A cover 22 closes these openings when the bearing is in use. The ring 16 is also provided with sockets or holes 23 to receive the pins of a spanner 24 (shown in Fig. 5), which may be inserted through the opening 20 to adjust the ring 16.

The end of the casing 9 is closed by an externally screw-threaded cap 25 which has a central angular projection 26 to receive a wrench. The cap 25 is also provided with transverse grooves or notches 27 which coöperate with the end of a set-screw 28 to retain the cap 25 in position circumferentially.

The bearing disk 12 is preferably screw-threaded on the shaft 2 and is positively retained in position by a reversely screw-threaded nut 29 which is locked by means of a split pin 30.

The interior of the casing 9 of the thrust bearing is preferably supplied with lubricating oil by being connected with the interior of the gear casing 5. For this purpose a channel or duct 31 is made in the bushing 8 and communicates with a duct or port 32 in the casing 9. Connection between these ducts may be established or cut off by means of the slide-valve 33, having a hole 34 adapted to register with said ducts. A duct 35 also allows the oil to pass beyond the ring 16.

The operation and manner of adjusting my improved bearing will be apparent from the above description, but particular note should be made of the fact that the bonnet or casing for the thrust bearing is located where its removal or attachment as well as the adjustment of the bearing may be accomplished without interfering in any way with the other parts of the apparatus. In removing or cleaning the thrust bearing, the only oil that it is necessary to draw off is that in the bonnet or auxiliary casing 9, because the valve 33 may be closed. The thrust bearing is adjustable from both sides, thus enabling the shaft, and consequently the worm, armature and commutator to be always maintained in their normal positions.

Having thus described one embodiment of my invention, I do not wish to be understood as being limited to the exact details of form and arrangements of parts set forth, for various changes may be made by one skilled in the art without departing from the spirit and scope of my invention.

What I claim and desire to protect by Letters Patent is:—

1. A thrust bearing, comprising a casing open at one end and adapted to be attached at its open end to a housing or main casing, adjustable bearing parts carried on the interior longitudinal sides of the first named casing, a disk located between said parts, and means for attaching said disk to a power shaft.

2. A thrust bearing, comprising a casing open at one end and adapted to be attached at its open end to a housing or main casing, adjustable screw threaded bearing parts carried on the interior longitudinal sides of the first named casing, a disk located between said parts, and means for attaching said disk to a power shaft.

3. A thrust bearing, comprising an auxiliary casing open at one end and adapted to be attached at its open end to a housing or main casing, an adjustable ring carried on the interior longitudinal sides of the auxiliary casing, an adjustable cap closing one end of said auxiliary casing, a disk located between said cap and said ring, and means for attaching said disk to a power shaft.

4. A thrust bearing, comprising a shaft, a disk carried thereon, a casing surrounding said disk and the end of said shaft, adjustable bearing parts carried on the interior longitudinal surface of said casing which is provided with openings at its upper side to allow access to said parts, and a removable cover for said openings.

5. A thrust bearing comprising a shaft, a disk carried thereon, a casing surrounding said disk and shaft, screw-threaded bearing parts carried on the interior longitudinal surface of said casing, said parts having recesses therein, and locking devices carried by said casing and engaging said recesses.

6. A thrust bearing, comprising a shaft, a disk carried thereon, a casing surrounding said disk and shaft, a screw-threaded ring on the interior of said casing, a screw-threaded cap closing the end of said casing, said ring and cap being provided with notches, and set screws carried by said casing and engaging said notches.

7. A thrust bearing, comprising a shaft, a bearing disk carried adjacent the end thereof, a casing surrounding the end of said shaft, and adjustable bearing parts carried on the interior longitudinal surface of said casing and coöperating with said disk.

8. A thrust bearing comprising a main casing adapted to inclose a suitable power mechanism, a shaft connected with said power mechanism, a bearing disk fixed adjacent the end of said shaft, an auxiliary casing surrounding said disk and removably attached to said main casing, an adjustable ring carried on the interior of said auxiliary casing, and an adjustable cap on the end of said casing, said ring and cap coöperating with said disk to afford axial adjustment of said bearing.

9. In combination with a main casing adapted to contain oil, a thrust bearing located exteriorly thereof, an auxiliary casing therefor carried by said main casing, ducts connecting the interiors of said casings, and a valve for closing said ducts.

FRANK H. COURTNEY.

Witnesses:
 WALTER S. JONES,
 EDW. W. VAILL, Jr.